(12) United States Patent
Nguyen et al.

(10) Patent No.: US 7,434,068 B2
(45) Date of Patent: Oct. 7, 2008

(54) CONTENT PROTECTION IN NON-VOLATILE STORAGE DEVICES

(75) Inventors: Tom L. Nguyen, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 10/055,572

(22) Filed: Oct. 19, 2001

(65) Prior Publication Data

US 2003/0079138 A1    Apr. 24, 2003

(51) Int. Cl.
G06F 21/02 (2006.01)
H04L 9/28 (2006.01)

(52) U.S. Cl. .................. 713/193; 713/194; 713/190; 713/189; 713/2

(58) Field of Classification Search .............. 713/1, 713/2
See application file for complete search history.

(56) References Cited

U.S. PATENT DOCUMENTS

| | | | | |
|---|---|---|---|---|
| 5,822,581 A * | 10/1998 | Christeson | .............. | 713/1 |
| 5,892,906 A * | 4/1999 | Chou et al. | .............. | 726/19 |
| 5,918,047 A * | 6/1999 | Leavitt et al. | .............. | 713/2 |
| 6,026,016 A * | 2/2000 | Gafken | .............. | 365/185.04 |
| 6,175,904 B1 * | 1/2001 | Gunderson | .............. | 711/162 |
| 6,185,696 B1 * | 2/2001 | Noll | .............. | 714/6 |
| 6,389,539 B1 * | 5/2002 | Hamilton et al. | .............. | 726/21 |
| 6,487,646 B1 * | 11/2002 | Adams et al. | .............. | 711/163 |
| 6,584,559 B1 * | 6/2003 | Huh et al. | .............. | 713/2 |
| 6,651,188 B2 * | 11/2003 | Harding et al. | .............. | 714/38 |
| 6,715,106 B1 * | 3/2004 | Mermelstein | .............. | 714/36 |
| 6,757,838 B1 * | 6/2004 | Chaiken et al. | .............. | 714/5 |
| 2002/0157010 A1 * | 10/2002 | Dayan et al. | .............. | 713/191 |
| 2004/0034819 A1 * | 2/2004 | Haydock | .............. | 714/43 |

FOREIGN PATENT DOCUMENTS

EP    1030237 A1 *    8/2000

* cited by examiner

Primary Examiner—Ayaz Sheikh
Assistant Examiner—Saoussen Besrour
(74) Attorney, Agent, or Firm—Blakely, Sokoloff, Taylor & Zafman LLP

(57) ABSTRACT

Content stored in a non-volatile storage device is protected from unauthorized modification and/or access. The device is configured as one or more regions, where one or more of the regions implements one or more content protection schemes. The current version of the contents stored in a region is compared to a previously stored valid version to determine if the current version has been modified without authorization. A region may be protected by use of an integrity metric (e.g., checksum, bit mask, and/or cyclic redundancy check value). The methodology may be implemented during the start up sequence of a computer system to protect the basic I/O system (BIOS) from unauthorized modification.

12 Claims, 4 Drawing Sheets

CONTENT PROTECTION IN NON-VOLATILE STORAGE DEVICES

FIELD

The invention pertains generally to non-volatile memory devices. More particularly, the invention relates to protecting content store in non-volatile storage devices from unauthorized modifications and/or access.

BACKGROUND

Non-volatile storage and/or memory devices are employed by many electronic devices to store persistent information. A complementary metal oxide semiconductor (CMOS) is one such non-volatile storage device. The CMOS may act as a non-volatile store of information. In one implementation, a CMOS storage device may be employed to store configuration, identity, and/or setup information about a system or device. For example, a CMOS device may be employed by a computer to store Basic Input/Output System (BIOS) information.

However, information stored in non-volatile devices may be intentionally or unintentionally changed, corrupted, or deleted. That is, environmental conditions (static, shock, etc.), intermittent device failures, or authorized or unauthorized access by a user and/or application may cause the information stored in the non-volatile device to be altered or deleted. For example, in a typical computer system a CMOS storage device stores information pertinent to central processing unit (CPU) and chipset configurations, errata, FWH security, etc. Because typical non-volatile storage devices lack hardware level security support, the information stored therein may be accessed and/or modified by users or applications. This creates the risk that such changes may hinder or prevent the proper operation of systems which rely on such information.

DETAILED DESCRIPTION

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

The invention provides a system, device, and method to protect information and/or content in a non-volatile storage device from unauthorized or unprivileged modifications and/or access.

One aspect of the invention provides for protecting the content stored within a non-volatile device by implementing one or more content security or integrity measures.

Figure 1:
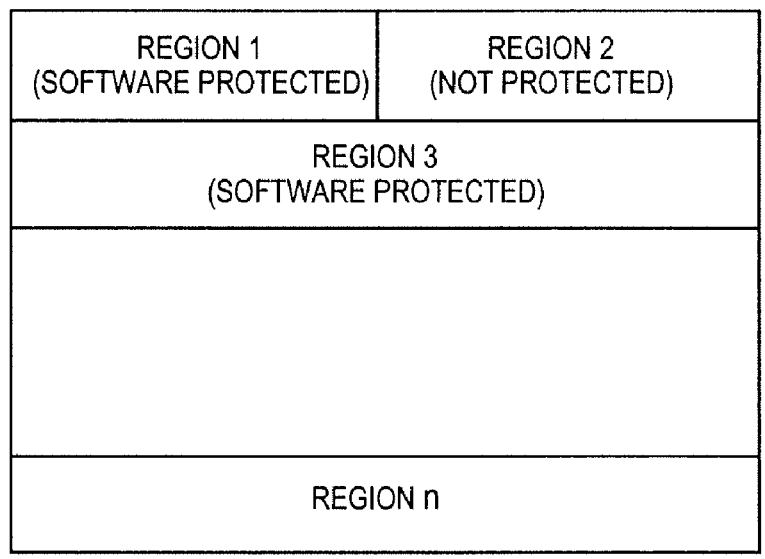
FIG. 1 is a diagram illustrating how information stored in various portions of a non-volatile storage device may be protected by different security measures.

Referring to FIG. 1, a non-volatile memory device may be physically and/or logically divided into one or more regions (Regions 1 through n), each region of one or more contiguous bytes. In one implementation, each region may be defined as a specific number of contiguous bytes. In various embodiments each region may be protected by one or more security measures which inhibit or prevent the unauthorized deletion or modification of the content stored therein. For example, in FIG. 1, Regions 1 and 3 are protected by a software scheme (such as encryption, checksum, mask bits, and/or cyclic redundancy check) while Region 2 is unprotected. In various embodiments each of the one or more regions of the non-volatile storage device may implement one or more forms of content protection or none at all.

Figure 2:
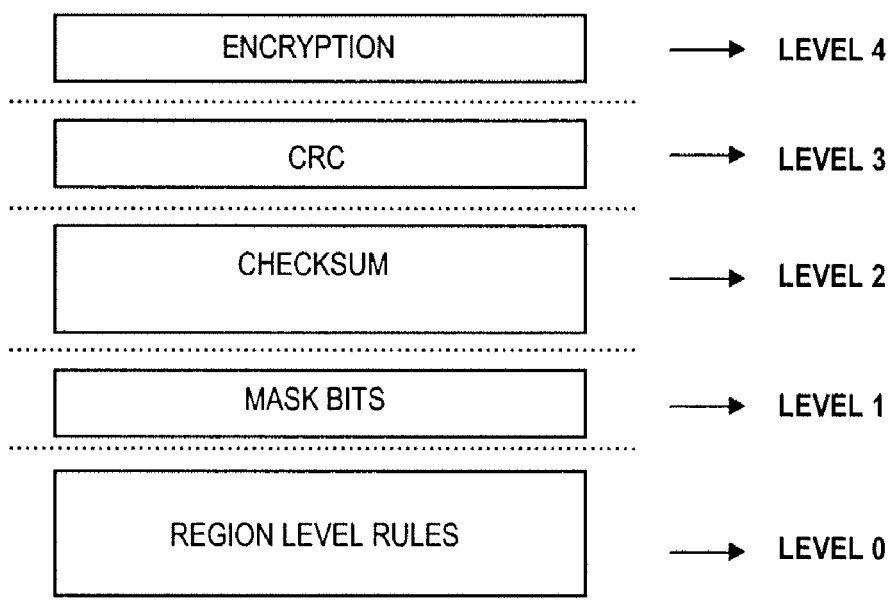
FIG. 2 is a diagram illustrating various levels of security that may be employed to protect information stored in a non-volatile device.

FIG. 2 illustrates some of the security measures that may be employed by one embodiment of the invention. At a first level (Level 0), the invention specifies how the non-volatile device is divided into regions for purposes of implementing content protection in one or more regions. Levels 1-4 illustrate various content protection schemes (Mask Bits, Checksum, CRC, and Encryption) that may be implemented at each of the specified regions implement. Each region may be protected by one or more of the schemes (Levels 1-5).

In one embodiment, integrity metrics (such as checksum, CRC, and/or bit mask) may be obtained for the stored content sought to be protected. An integrity metric may be one or more values which are indicative of the validity of the content.

According to one implementation mask bit protection is provided by requiring a particular bit or bits within one or more bytes of a specified storage region to be a certain values (either 1 or 0 for instance). By checking the state or value of the masked bit(s), it can be determined if the content of a region has been changed. That is, if a mask bit(s) is found to have been changed (the bit state/value is different than what it should be) then content is assumed to have been changed.

Checksum protection may also be implemented, alone or in combination with other protection schemes. According to one checksum implementation, the sum of all bytes stored within a region is stored. Then the integrity of the stored content may later be checked by comparing the sum of the bytes to the previously stored value. In various implementations, only a portion of the byte sum is stored and compared. For instance, only the lower byte(s), or only the upper byte(s), of the sum may be stored for later comparison.

As with checksums, cyclic redundancy check (CRC) may also be implemented to provide an indication of whether one or more bits or bytes stored in a region have changed since the CRC was last calculated.

Yet another method of protecting content against unauthorized access and/or modification is the use of encryption. The content (bytes) stored in a particular region may be encrypted to prevent unauthorized users or applications from reading this content. In one implementation, the content in each region may be encrypted with different encryption keys. Even if an application is capable of accessing a particular storage location, encryption prevents extraction of the information embodied therein.

Although several content protection schemes have been illustrated above, the invention is not limited to these schemes (e.g. mask bits, checksum, CRC, or encryption) and other content protection schemes may be implemented without deviating from the invention.

Another aspect of the invention provides for a way to make use of the content security and/or integrity measures described above within a system.

Figure 3:
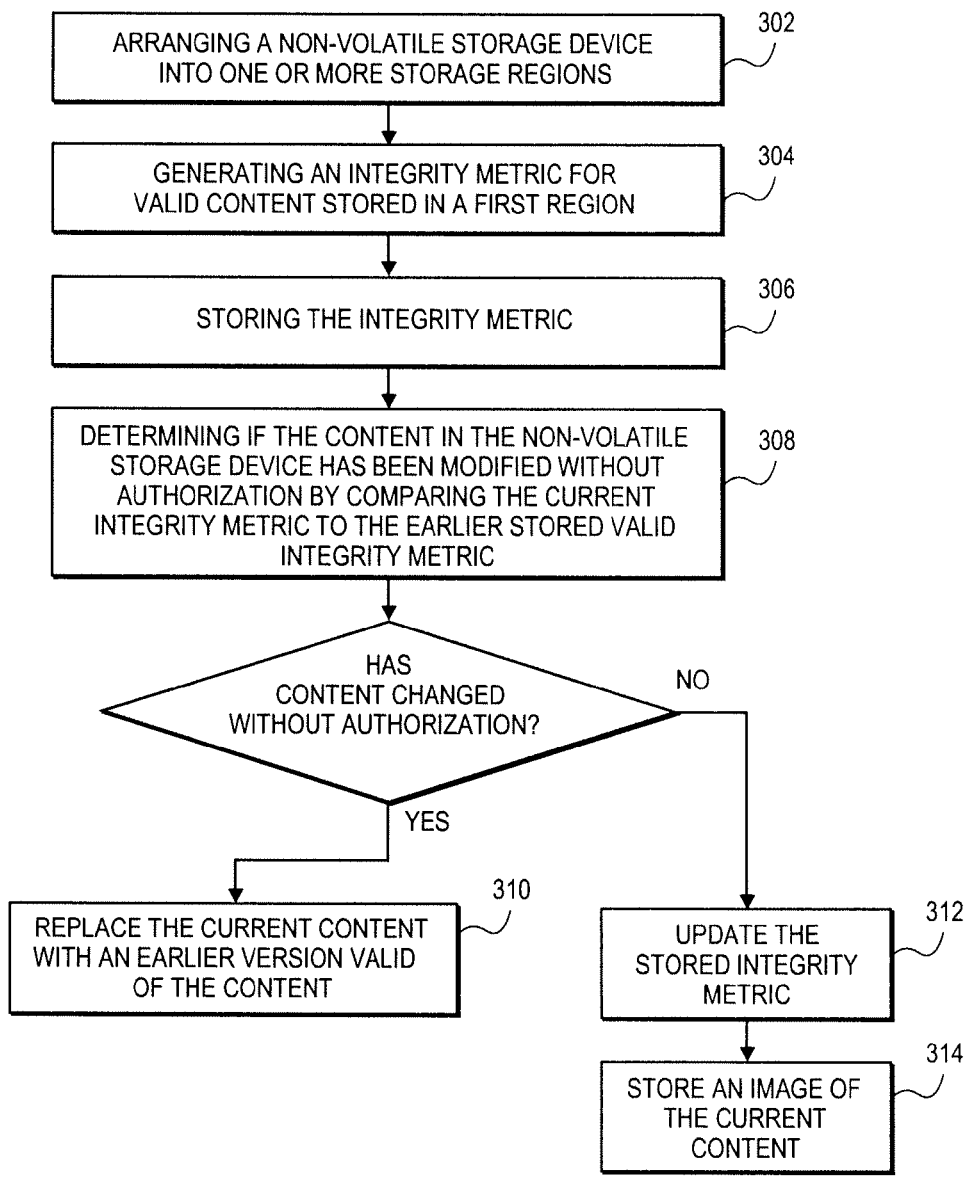
FIG. 3 is a block diagram illustrating one method of implementing content protection in non-volatile storage devices according to one embodiment of the invention.

Referring to FIG. 3, an example illustrating the steps of one implementation of the content protection method is shown. A non-volatile storage device is configured into one or more regions as described above 302. An integrity metric (e.g. bit mask, checksum, cyclic redundancy check) is calculated for valid data 304 and then stored 306. At a later time, such as during a subsequent reboot for instance, the system checks the integrity of the content in the non-volatile storage device to determine if it has been modified without authorization 308. This may be accomplished in a number of ways, including comparing the previously stored integrity metric to a newly calculated integrity metric for the current content in the storage device. If the current content is found to have been changed in an unauthorized manner, then the content of the region, or of the whole device, is replaced with a previously saved valid image of the content 310. If the current content is found to be modified in an authorized manner, then the integrity metric is updated to correspond to the current content 312. Additionally, an image of the modified but valid content is stored in another location for later reference 314.

In one implementation, a system which desires to protect one or more regions of content within a non-volatile device may store a mirror image of the one or more regions. The mirror image is an exact copy of the content in a particular region. This mirror image may be used at a later time to replace content which is determined to have been changed without authorization. In other embodiments, the stored image may also be used to compare it to the current content in the non-volatile device to determine if the current content has been changed since the image was stored.

In one implementation, the mirror image is stored in a memory storage device or location which is 'locked' to prevent it from being modified by other users or applications. Such locking may be accomplished in numerous ways, including setting one or more bits or flags to indicate that such memory or storage location may not be used.

Another aspect of the invention provides that whenever an authorized user or application changes the content stored in a non-volatile storage device a mirror image of the content is stored. That is, the previous image of the content is replaced by a new image of the content when modified by authorized means.

Authorized means or interfaces for changing or modifying the content stored in a non-volatile device include software applications and/or embedded code specifically authorized by the system to change content within the non-volatile storage device. On the other hand, unauthorized means for changing the stored content includes directly accessing the non-volatile devices storage locations and changing the content without going through an authorized interface.

According to one implementation, the invention may be practiced with a CMOS device containing the Basic Input Output System (BIOS) for a processing or computing device.

Figure 4:
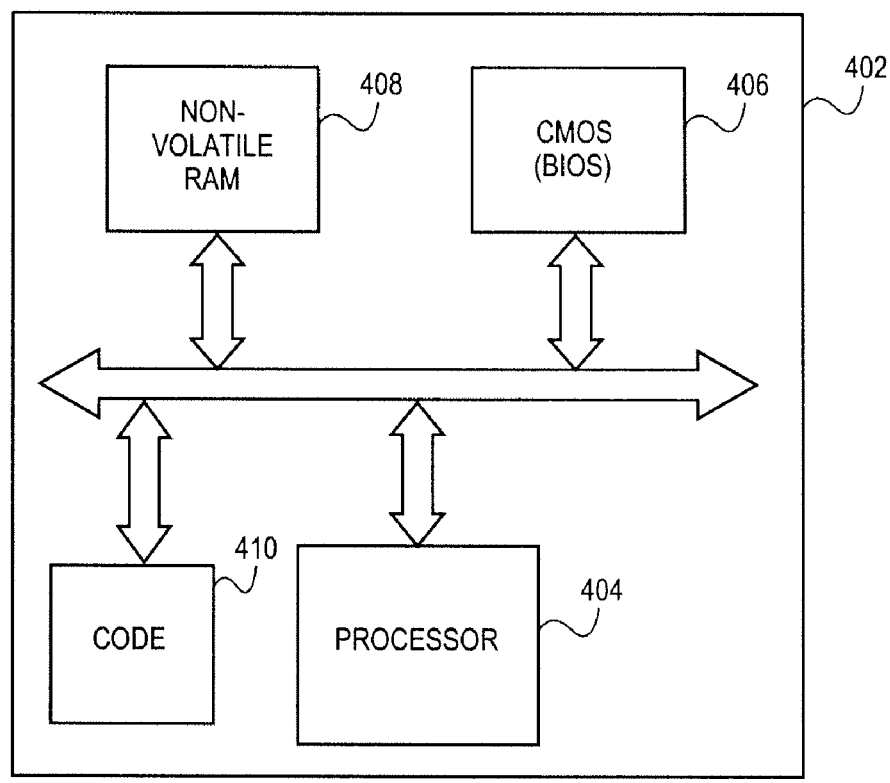
FIG. 4 is a block diagram illustrating a processing device embodying one implementation of the content protection invention.

FIG. 4 illustrates one implementation of a processing device 402 configured to implement the content protection scheme for non-volatile devices described above. The processing device includes a processor 404 communicatively coupled to a CMOS device 406, a non-volatile read-only memory (RAM) device 408, and a code storage device 410.

Upon starting the processing device 402, the processor is configured to access the code storage device 410 and execute the code therein. The code in the code storage device 410 instructs the processor to check whether the content (BIOS) found in one or more regions of the CMOS device 406 has been altered or modified. In one implementation, this may be accomplished by the processor comparing the mask bits, cyclic redundancy check, and/or checksum of the content in the CMOS regions to the previously stored corresponding values. In another implementation, the processor compares (e.g. byte-by-byte comparison) the content (BIOS) in each region to the previously stored mirror image of the content to determine if it has been changed without authorization.

If the content is found to have been changed without authorization, the processor 404 causes the changed region(s), or the changed content regions, to be replaced by the previously stored mirror image.

According to one embodiment, the previously stored value(s) (e.g. checksums, CRC, etc.) and/or the previously stored mirror image of the content (e.g. BIOS) are stored in the non-volatile RAM device 408. In one implementation the code storage device may be a flash memory device.

Figure 5:
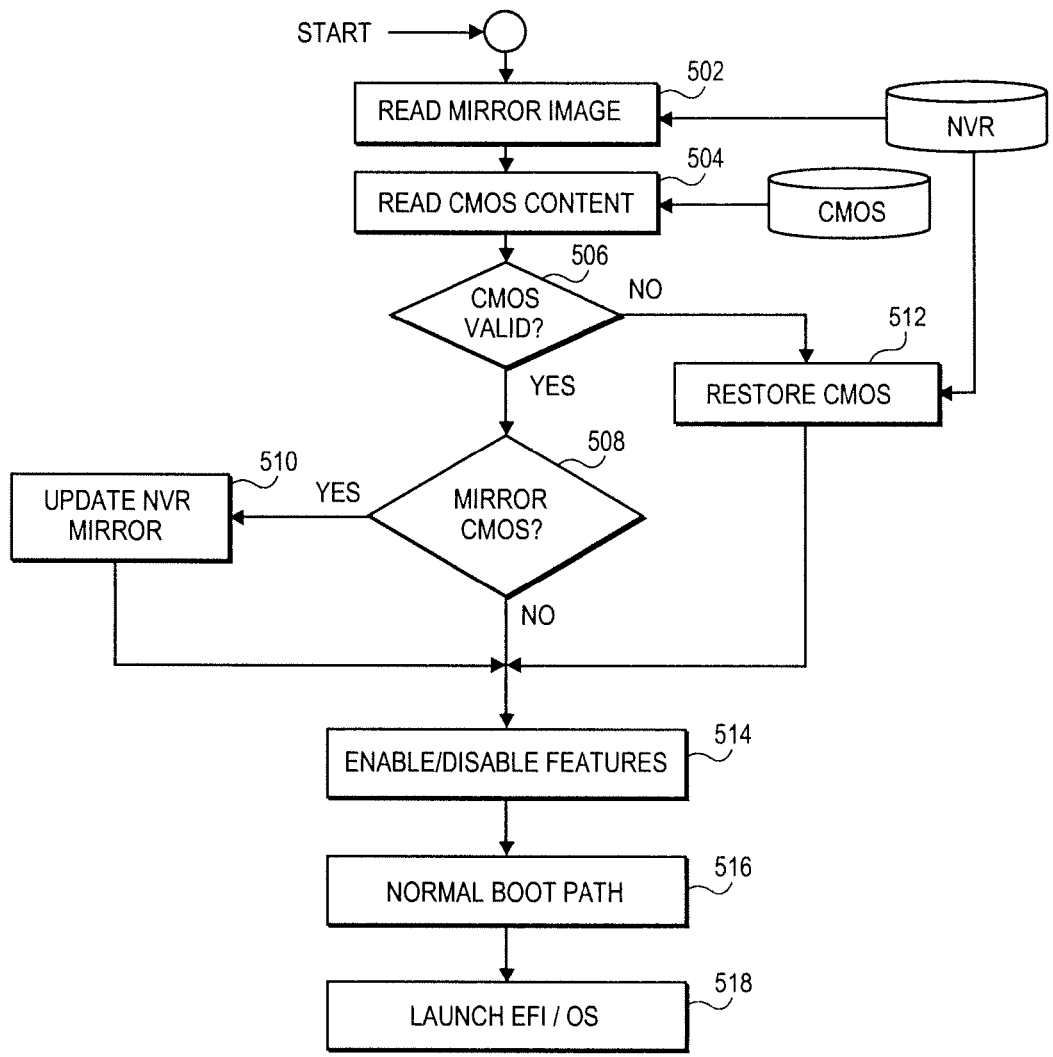
FIG. 5 is a block diagram illustrating one method of implementing a mirroring security technique to safeguard information stored in non-volatile devices according to one embodiment of the invention.

FIG. 5 illustrates one method of content protection in a non-volatile device within a processing device or system such as a computer system. This method may be practiced in the computing device illustrated in FIG. 4 for instance. The non-volatile storage device may be logically divided into regions, one or more of the regions implementing one or more of the security measures described above.

Upon starting or restarting a system, the system reads a previously stored image (mirror image) of the content sought to be protected 502. In one embodiment, the mirror image is stored in a non-volatile RAM (NVR) device. In another embodiment, instead of reading the whole mirror image, the system may read one or more checksums, CRC, and/or mask bits for each region.

The system then reads the non-volatile device storing the current version of the content 504. For example, in a computer system the CMOS storing the BIOS (the content sought to be protected) may be read.

The system then determines if the content currently in the non-volatile device is valid 506. That is, it determines if there has been an unauthorized change of the content since the last time it was validated or checked. This may be accomplished in numerous ways. For example, a byte-by-byte comparison may be performed between the mirror image and current image of the content. In another embodiment, the current image of the content may be validated to determine if it satisfies the previously stored mask bits, checksum, and/or CRC. Any other method of validating the current data may be employed without departing from the invention.

If the current content in the non-volatile storage (CMOS) device is found to be valid (there are no unauthorized changes) then a decision is made whether to save the image of the current content 508. A mirror image of the current content may be stored 510 for instance if the current content, although different from the previously stored valid content, is found to contain authorized changes.

If the current content in the CMOS device is found to have been changed without authorization, then the previously saved image is restored 512. That is, the mirror image previously saved in the NVR is copied to the CMOS device.

The system may then enable one or more of the security features described above 514. For example, the system may encrypt the content in one or more regions of the CMOS device, perform checksum or CRC calculations, or implement or set a bit mask pattern.

The system may then proceed with its normal startup procedure 516. For example, it may perform other boot-up tasks and then run an operating system (OS) or launch an extended firmware interface 518.

Although in the examples above one or more aspects of the invention depict a CMOS device used for BIOS storage, the invention is not limited to such device or implementation and may be practiced with other non-volatile devices with other content.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, software or a combination thereof. The invention or parts of the invention may also be embodied in a processor readable storage medium or machine-readable medium such as a magnetic, optical, or semiconductor storage medium.

What is claimed is:

1. A system comprising:
   a first non-volatile data storage device, configured as a plurality of storage regions to store CMOS memory data, wherein the device lacks hardware security such that some of the CMOS memory data storage regions are modifiable by an application program on the system, each of the regions being protected by at least two software schemes including a set of one or more region level rules and another scheme selected from the group consisting of (1) mask bits, (2) checksum, (3) cyclic redundancy check, CRC, and (4) encryption;
   another, second non-volatile data storage device to store a mirror image of the CMOS memory data in a locked location;
   a program store to store processor-readable instructions that implement each of the at least two software schemes to ascertain the validity of the CMOS memory data stored in the first non-volatile storage device on a region by region basis and, when data stored in any one of the storage regions is found to be invalid, replace the CMOS memory data in said one of the storage regions of the first non-volatile storage device with the stored mirror image of the data; and
   a processing unit coupled to the first and second non-volatile data storage devices and program store, to read and process the one or more instructions in the program store.

2. The system of claim 1 wherein the processing unit is to process the instructions in the program store as part of a start-up procedure.

3. The system of claim 1 wherein the program store is inside said second non-volatile data storage device.

4. The system of claim 1 wherein the processing unit is to compare mask bits, cyclic redundancy check, and/or checksum of the content in each of the plurality of storage regions to previously stored corresponding values, in order to ascertain the validity of the CMOS memory data stored in the first non-volatile storage device.

5. The system of claim 1 wherein the region level rules define which bit of a particular byte in a given storage region holds a mask bit.

6. The system of claim 1 wherein the region level rules define which byte of a given storage region holds a mask bit, which byte holds a checksum, and which byte holds a CRC value.

7. The system of claim 1 further comprising:
   generating a copy of current data in the first non-volatile storage device when an authorized application modifies the current data; and
   storing the copy as a valid image of the current data.

8. A method comprising:
   reading CMOS memory content stored in a plurality of storage regions of a first non-volatile storage device of a system, wherein the first device lacks hardware security such that the CMOS memory content is modifiable by an application program in the system, each of the regions being protected by at least two software schemes which include a set of region level rules and another scheme selected from the group consisting of (1) mask bits, (2) checksum, (3) CRC, and (4) encryption;
   reading from a valid image of the CMOS memory content, that is stored in a further, second non-volatile storage device;
   determining when the CMOS memory content in the first device has been modified without authorization by comparing a previously stored checksum, corresponding to the valid image of the CMOS memory content within only a selected one of the plurality of storage regions, and a checksum corresponding to the CMOS memory content within said selected one of the storage regions, and by comparing a previously stored cyclic redundancy check value, corresponding to the valid image of the CMOS memory content within only a selected further one of the storage regions, and a cyclic redundancy check value corresponding to the CMOS memory content within said selected further one of the storage regions; and
   replacing the CMOS memory content with said stored valid image when the CMOS memory content is determined to have been modified without authorization.

9. The method of claim 8 wherein the determining comprises:
   comparing (1) the valid image of the CMOS memory content within a still further one of the storage regions to (2) the CMOS memory content within said still further one of the storage regions, to determine when the CMOS memory content has been modified.

10. The method of claim 8 wherein determining when the CMOS memory content has been modified without authorization further includes
    comparing (1) a previously stored bit mask, corresponding to the valid image of the CMOS memory content within only the selected one or the selected further one, of the storage regions, and (2) a bit mask corresponding to the CMOS memory content within said selected one or said selected further one of the storage regions.

11. The method of claim 8 further comprising:
    storing a valid image of the CMOS memory content for later use.

12. The method of claim 8 wherein reading the CMOS memory content from the first non-volatile storage device is part of a start-up procedure of the system.

* * * * *